(12) United States Patent
Carter

(10) Patent No.: US 6,758,382 B1
(45) Date of Patent: Jul. 6, 2004

(54) AUTO-ADJUSTABLE TOOL FOR SELF-REACTING AND CONVENTIONAL FRICTION STIR WELDING

(75) Inventor: Robert W. Carter, Madison, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/431,655

(22) Filed: May 2, 2003

(51) Int. Cl.$^7$ .................................................. B23K 20/12
(52) U.S. Cl. ........................ 228/2.1; 228/8; 228/112.1
(58) Field of Search ........................... 228/102, 112.1, 228/2.1, 8

(56) References Cited

U.S. PATENT DOCUMENTS

| | | |
|---|---|---|
| 5,460,317 A | 10/1995 | Thomas et al. |
| 5,794,835 A | 8/1998 | Colligan et al. |
| 6,050,474 A | 4/2000 | Aota et al. |
| 6,199,745 B1 | 3/2001 | Campbell et al. |
| 6,237,835 B1 | 5/2001 | Litwinski et al. |
| 6,367,681 B1 | 4/2002 | Waldron et al. |
| 6,557,746 B2 * | 5/2003 | Ezumi et al. ............. 228/112.1 |
| 2003/0201307 A1 * | 10/2003 | Waldron et al. .......... 228/112.1 |
| 2003/0209588 A1 * | 11/2003 | Colligan ................... 228/112.1 |

FOREIGN PATENT DOCUMENTS

| | | | |
|---|---|---|---|
| DE | WO000136143 A1 * | 5/2001 | |
| EP | 1188508 A2 * | 3/2002 | |
| JP | 02001269780 A * | 10/2001 | |
| JP | 2001-287053 | 10/2001 | |
| JP | 2002-018580 | 1/2002 | |
| JP | 2002-045981 | 2/2002 | |
| JP | 02002086281 A * | 3/2002 | |
| JP | 02003071574 A * | 3/2003 | |
| JP | 02003181654 A * | 7/2003 | |
| WO | WO/99/52669 | 10/1999 | |

* cited by examiner

*Primary Examiner*—Kiley Stoner
(74) *Attorney, Agent, or Firm*—James J. McGroary; Stephen J. Stark

(57) ABSTRACT

A friction stir welding device that is configured to perform convention friction stir welding as well as self-reacting friction stir welding. A pin passes through an upper shoulder and can selectively attach to and detach from a lower shoulder in a preferred embodiment. A controller maintains the discrete position of, and/or force applied by, the upper and lower shoulders during self-reacting friction stir welding, or maintains the pin at a desired depth and/or applied force during conventional friction stir welding.

19 Claims, 1 Drawing Sheet

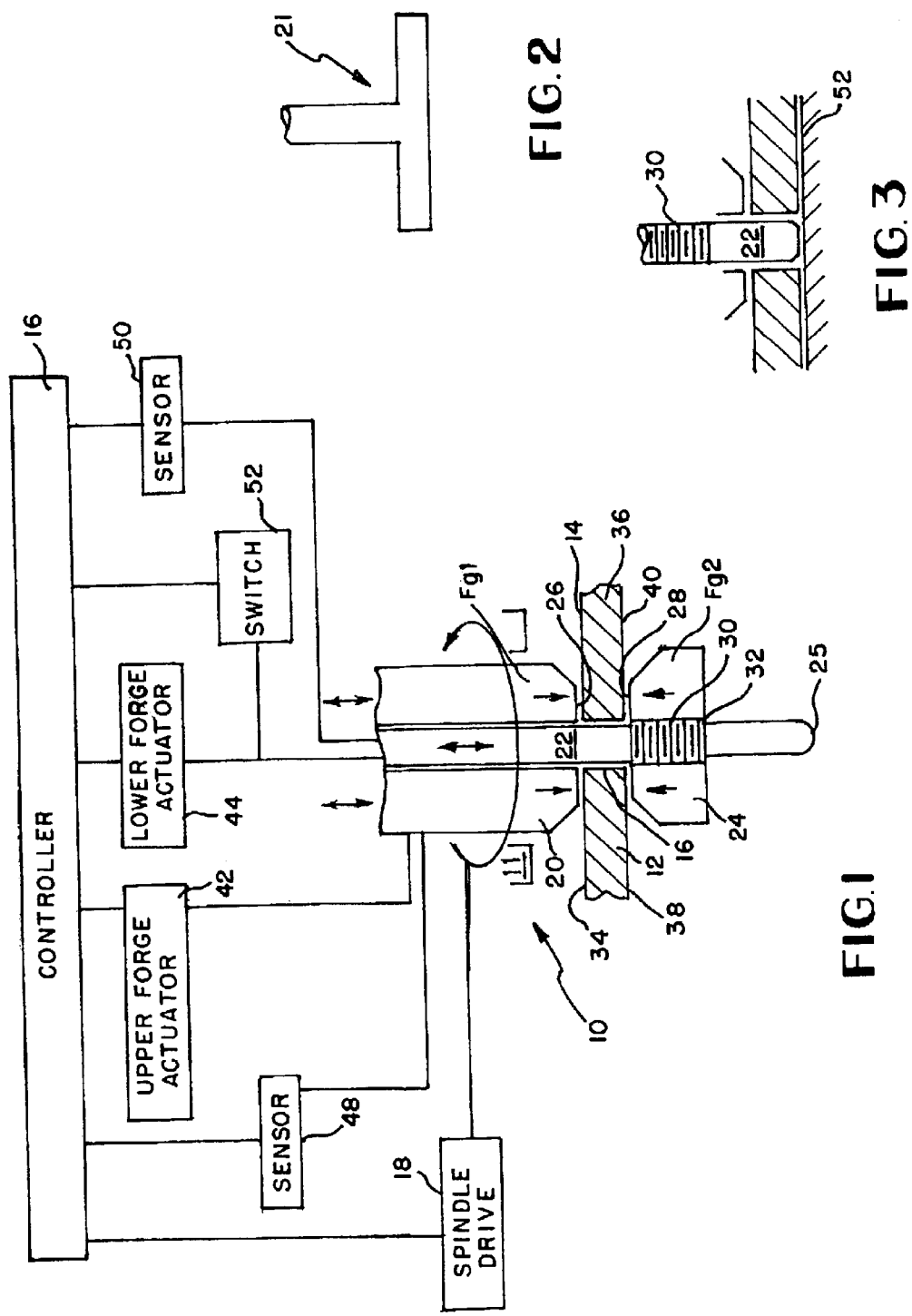

AUTO-ADJUSTABLE TOOL FOR SELF-REACTING AND CONVENTIONAL FRICTION STIR WELDING

STATEMENT OF GOVERNMENT INTEREST

This invention was made by an employee of the United States Government and may be manufactured and used by or for the Government for governmental purposes without the payment of any royalties thereon or thereof.

BACKGROUND OF THE INVENTION

1. Field of the Invention

The present invention is directed to a friction stir welding device and, more particularly, to a machine tool capable of performing conventional friction stir welding while manipulating pin length in real time as well as capable of performing self-reacting friction stir welding while making real time adjustments to the distance between the upper and lower shoulders.

2. Description of Related Art

The general concept of friction stir welding is described in U.S. Pat. No. 5,460,317. Conventional friction stir welding is a process of welding component pails together using the frictional heat generated by a non-consumable tool to join work piece sections. The tool includes a pin that is inserted into the joint and a shoulder that is urged against an upper surface of the work piece. The pin and shoulder rotate to generate friction needed to create a plasticized region along the joint for the welding operation.

For conventional friction stir welding operation, a workpiece is generally supported by a rigid table or anvil typically formed with a steel plate. The anvil stabilizes the actuation force of the upper shoulder to maintain the integrity of the workpiece so that the workpiece does not bend or deform under load. In order to maximize the strength of the joint between workpiece sections, the pin should extend the entire thickness of the workpiece. U.S. Pat. No. 6,199,745 attempts to address this issue by providing a unique probe pin. This pin allows for self-reacting friction stir welding since it has a rotating bottom shoulder that cooperates with the upper shoulder. However, it makes no provision for performing conventional friction stir welding.

Other improvements have taken place in this art. U.S. Pat. No. 5,893,507 describes an auto-adjustment pin tool for friction stir welding which allows the pin to be incrementally withdrawn from the workpiece thereby eliminating craters or key holes in the weld after completion of the weld. While this design may be effective for conventional friction stir welding, it makes no provision for self-reacting friction stir welding.

U.S. Pat. No. 5,697,544 shows an adjustable pin for a friction stir welding tool which allows the shoulder to move relative to the pin tool. This design makes no provision for self-reacting friction stir welding.

Accordingly, there exists a need for a tool and method for performing both conventional and self-reacting friction stir welding which will provide for the adjustment of the pin length in real time during conventional welding as well as for the adjustment of the distance between the upper and lower shoulders in real time during self-reacting friction stir welding.

SUMMARY OF THE INVENTION

An object of the present invention is to provide a tool which can perform both conventional friction stir welding (FSW) as well as self-reacting friction stir welding (SR-FSW).

Another object of the present invention is to provide a method for providing FSW and SR-FSW utilizing auto-adjustable pin tool (APT) technology as well as an ability to adjust the distance between opposing shoulders when performing SR-FSW.

Another object of the present invention is to provide a dual capability machine tool not known in the art to provide both FSW and SR-FSW capability.

Another object of the present invention is to incorporate auto-adjustable pin tool (APT) technology into a machine tool for performing either FSW or SR-FSW processes.

Another object of the present invention is to provide a tool having the ability to provide a replaceable upper shoulder and pin and/or to add and subsequently remove a lower side shoulder from the pin so that a single tool can be utilized to perform conventional as well as self-reacting FSW.

By providing this capability in a FSW device, it is believed that a significant reduction in costs can be experienced by a facility contemplating the purchase of conventional FSW equipment as well as SR-FSW equipment. The tool is preferably equipped with a replaceable upper shoulder and pin and/or a pin configured to receive a removable lower shoulder. Accordingly, a single tool may be utilized for both FSW and SR-FSW operations. A closed-loop control system allows the position and/or load on each shoulder (in SR-FSW), or on the upper shoulder and pin (in conventional FSW), to be controlled independently or in unison.

BRIEF DESCRIPTION OF THE DRAWINGS

The particular features and advantages of the invention as well as other objects will become apparent from the following description taken in connection with the accompanying drawings in which:

FIG. 1 shows a schematic cut away view of a friction stir welding device constructed in accordance with the presently preferred embodiment of the present invention;

FIG. 2 shows a side plan view of a first alternatively preferred pin for use with the tool of FIG. 1; and FIG. 3 shows a portion of the tool of FIG. 1 with the lower shoulder member removed.

DETAILED DESCRIPTION OF THE DRAWINGS

FIG. 1 schematically illustrates a preferred embodiment of a friction stir welding device 10 for friction stir welding application. The tool 10 welds workpiece sections 12,14 at joint 16. The tool 10 is connected to a spindle drive 18, or other driver, which rotates upper shoulder member 20 along with pin 22 and lower shoulder member 24 when attached as shown in FIG. 1. The pin and lower shoulder member (when attached) may be rotationally driven either dependently (at the same rotational velocity) or independently (thereby allowing different rotational velocities) relative to the upper shoulder member.

FIG. 1 shows the tool 10 configured for self-reacting friction stir welding (SR-FSW). In this embodiment, the lower shoulder member 24 is attached to the pin 22. In the illustration, the pin 22 is equipped with threads 30 which cooperate with internal threads 32 in the lower shoulder member 24. By coordinating the direction of the threads 30 and internal threads 32 of the lower shoulder member 24 along with the direction of rotation of the spindle drive 18, the lower shoulder member 24 can be retained on the pin 22. Although cooperating threads 30 are one way of retaining the pin 22 to the lower shoulder member 24, other connectors and/or methods may also be utilized so that the lower shoulder member 24 may be detached and reattached at the will of the operator. The lower shoulder member 24 is connected intermediate the upper shoulder 26 and the distal end 25 of the pin 22.

As can be seen from FIG. 3, the lower shoulder member 24 may be selectively removed from the tool 10. In FIG. 1, the lower shoulder member 24 is shown in an installed configuration and in use relative to the pin 22 and upper shoulder member 20 so that SR-SFW can be performed on the work pieces 12,14. In FIG. 3 the lower shoulder member 24 has been removed from the pin 22 and tool 10 such that the same pin 22, or alternatively another pin as will be discussed below, can be utilized to perform conventional friction stir welding as is known in the art and as seen in FIG. 3.

Upper shoulder member 20 is shown in FIG. 1 supported so that upper shoulder 26 abuts upper surfaces 34,36 of work piece sections 12,14. Pin 22 extends through the joint 16 and lower shoulder 28 of lower shoulder member 24. Lower shoulder 28 abuts lower surfaces 38,40 of work piece sections 12,14. An upper forge actuator 42 is illustrated coupled to the upper shoulder member 20 and a lower forge actuator 44 is illustrated coupled to the lower shoulder member 24, when installed, through pin 22. For SR-FSW welding operation, the spindle drive 18 rotates and the upper and lower shoulder members; and the upper and lower forge actuators 42,44 supply forging forces $F_{g1}$, $F_{g2}$ to upper and lower shoulder members 20,24, respectively. Rotation of pin 22 and upper and lower shoulder members 20,24 generates friction heat to create a plasticized region for joining the work sections 12,14 together.

Upper and lower forge actuators 42,44 and spindle drive 18 are connected to controller 46 as schematically illustrated in FIG. 1 for operation. The controller 46 directs upper and lower forge actuators 42,44 to maintain upper and lower shoulder members 20,24 and shoulders 26,28 in abutment with upper and lower surfaces 34,36 and 38,40, respectively, of the work pieces 12,14 to compensate for variations in work piece thicknesses and to provide a predetermined load on opposed surfaces of the work pieces 12,14. Sensors 48 and 50 are preferably utilized to provide feedback to the controller 46. The sensors 48,50 may be utilized to sense real-time force and/or position of the shoulders 26,28. By providing the sensors 48,50, the position of, or forging force on, the upper and lower shoulders 26,28 may be manipulated in real time by the controller 46.

Although this configuration works satisfactory for SR-FSW, it may be that the user desires a tool 10 which has the capability of performing SR-FSW as well as conventional FSW. In conventional FSW, there is no lower shoulder 28 or lower shoulder member 24 utilized. In fact, an anvil 52, illustrated in FIG. 3, or other appropriate lower surface is normally provided. Obviously, there is no way that a lower force actuator 44 could be utilized to apply forging force $F_{g2}$ independently of forging force $F_{g1}$ as shown in FIG. 1. In order to switch from the SR-FSW process or mode shown in FIG. 1 to the conventional FSW process or mode shown in FIG. 3, the lower shoulder member 24 is removed from the pin 22. Alternatively, pin 21 as shown in FIG. 2 may be utilized for the SR-FSW mode and then replaced with pin 22 as shown in FIG. 3 or another conventional friction stir weld pin known in the art. The upper shoulder member may also be completely removed and replace in order to provide the optimum shoulder geometry for the applicable process. The upper shoulder member can also be replaced with a tool holder that can be used to hold a conventional fixed-pin friction stir welding pin-tool. In the case of a using a conventional fixed-pin design the auto-adjustable pin must be removed or withdrawn into the spindle.

When operating in the conventional friction stir welding mode as shown in FIG. 3, the lower force forge actuator 44 functions more similarly to an auto-adjustable pin tool mechanism as described in U.S. Pat. No. 5,893,507. Specifically, as the tool 10 traverses an increasing thickness of the work piece, increased pressure is experienced on the upper shoulder member 26. The controller 46 senses this rise in pressure, and/or change in position of the work piece surface, and withdraws the upper shoulder member 20 to keep the pressure and or position relative to the work piece surface constant. At the same time the lower forge actuator 44 extends the pin 22 further from the shoulder to keep the pin tip 22 at the proper position relative to the work pieces 12,14. If the sensor 48 senses a reduction material thickness and/or forging pressure, the controller 46 moves the upper shoulder member towards the work pieces 12,14 (because of decreasing work piece 12,14 thicknesses) to maintain a constant pressure sensed at the sensor 48 and/or constant position of the shoulder relative to the work piece surface. At the same time the lower force forge actuator 44 moves upward to withdraw the pin tip 22 to the appropriate position relative to the work pieces 12,14.

In order to change the controller 46 from SR-FSW to conventional FSW mode, a switch 52 is preferably utilized to inform the controller 46 of whether the lower shoulder member 24 is attached or not. Alternatively, the controller 46 may withdraw the pin 22 with a lower forge actuator 44, and upon not sensing forge $F_{g2}$, will thereby activate switch 52 to allow the lower forge actuator 94 to provide auto adjusting pin tool (APT) capability in the conventional friction stir welding mode shown in FIG. 3. Alternatively, the switch 52 may be utilized to inform the controller 46 whether the pin 21 of FIG. 2 is utilized or the pin 22 of FIG. 3, or another appropriate pin or fixed-pin tool, is utilized without the lower shoulder member 24 connected thereto.

Numerous alterations of the structure herein disclosed will suggest themselves to those skilled in the art. However, it is to be understood that the present disclosure relates to the preferred embodiment of the invention, which is for purposes of illustration only, and not to be construed as a limitation of the invention. All such modifications, which do not depart from the spirit of the invention, are intended to be included within the scope of the appended claims.

Having thus set forth the nature of the invention, what is claimed herein is:

1. A friction stir welding device comprising:
    an upper shoulder having a bore therethrough;
    a pin extending perpendicularly along a pin axis through the shoulder, said pin having a distal end, said upper shoulder and said pin rotatably driven independently (the upper shoulder and the pin are not mechanically tied and may rotate at different rates) in a welding operation; and
    a lower shoulder removably connected to the pin intermediate the upper shoulder and the distal end of the pin, said lower shoulder having a larger perimeter than the pin;
    wherein the lower shoulder member further comprises a feature extending into the lower shoulder member which receives a portion of the pin with said feature mechanically locking the lower shoulder member to the pin.
2. The friction stir welding tool of claim 1 wherein the upper shoulder and pin are rotatably drivein in an independent rotation, wherein independent rotation is provided when the shoulder and pin are not mechanically tied together.

3. The friction stir welding tool of claim 1 further comprising a lower shoulder member and the lower shoulder is a portion of the lower shoulder member.

4. The friction stir welding tool of claim 1 wherein the lower shoulder further comprises a bore that is threaded and threadably receives the pin intermediate the distal end of the pin and the upper shoulder.

5. The friction stir welding tool of claim 1 further comprising an upper shoulder member and the upper shoulder is a portion of the upper shoulder member.

6. The friction stir welding tool of claim 2 wherein the pin and upper shoulder arm rotatably driven by a spindle drive.

7. A friction stir welding device comprising:
an upper shoulder having a bore therethrough;
a pin extending perpendicularly along a pin axis through the shoulder, said pin having a distal end, said upper shoulder and said pin rotatably driven either dependently (shoulder and pin are mechanically tied and rotate together) or independently (shoulder and pin are not mechanically tied and may rotate at different rates) in a welding operation;
a lower shoulder removably connected to the pin intermediate the upper shoulder and the distal end of the pin, said lower shoulder having a larger perimeter than the pin; and
a controller having a conventional stir welding mode and a self-reacting friction stir welding mode, and when in said conventional friction stir welding mode, one of a force applied by the upper shoulder and a discrete position of one of the upper shoulder and pin are controlled by the controller, and when in said self-reacting friction stir welding mode, the force applied by the upper and lower shoulders and a discrete position of the upper and lower shoulders are controlled by the controller.

8. The friction stir welding tool of claim 7 further comprising an upper forge assembly operably coupled to the controller and the upper shoulder, and a lower forge assembly operably coupled to the controller and the pin, said upper forge assembly configured to move the upper shoulder up and down relative to the pin axis, and said lower forge assembly configured to move the pin up and down along the pin axis.

9. The friction stir welding tool of claim 7 further comprising a switch having a first and second position, and when said switch is in the first position, said controller is in the conventional stir welding mode, and when in the second position, said controller is in the self-reacting stir welding mode.

10. A friction stir welding tool configured to perform at least one of conventional and self-reacting friction stir welding on a workpiece, said tool comprising:
an upper shoulder member, said upper shoulder member rotationally driven during a welding operation, and said upper shoulder member having an upper shoulder, said upper shoulder adapted to be movable toward and away from the workpiece;
an upper forge assembly operably coupled to the upper shoulder for moving the upper shoulder towards and away from the workpiece;
a pin extending through the upper shoulder member to contact the workpiece;
a lower forge assembly operably coupled to the pin for moving the pin toward and away from the workpiece; and a controller in communication with the upper and lower forge assemblies, said controller having a conventional friction stir welding mode and a self-reacting friction stir welding mode;
wherein when in said conventional friction stir welding mode, said lower forge assembly controls one of a discrete position of the pin and a force of insertion of the pin into the workpiece, and when in said self-reacting friction stir welding mode, said lower forge assembly controls one of a lower forging force applied through the pin to a lower surface of a workpiece and a discrete position of the lower shoulder.

11. The friction stir welding tool of claim 10 further comprising a switch, said switch changing the operation of the controller from conventional stir welding mode to self-reacting friction stir welding mode.

12. The friction stir welding tool of claim 10 wherein the switch is user activated.

13. The friction stir welding tool of claim 11 further comprising a lower shoulder movable with the pin below the workpiece and wherein the switch is activated based on the lower forging force reported to the controller.

14. The friction stir welding tool of claim 11 wherein the pin has a connector, and a lower shoulder member is attached to the connector in an attached configuration with said lower shoulder member having a lower shoulder contacting the lower surface of the workpiece, and said lower shoulder member is not attached to the connector in a disconnected configuration.

15. A friction stir welding tool configured to perform at least one of conventional and self-reacting friction stir welding on a workpiece, said tool comprising:
an upper shoulder member rotationally driven during a welding operation about a rotation axis, and said upper shoulder member having an upper shoulder, said upper shoulder adapted to be linearly movable along the rotation axis;
an upper forge assembly operably coupled to the upper shoulder for moving the upper shoulder linearly along the rotation axis;
a pin extending through the upper shoulder member along the rotation axis and having a distal end;
a lower forge assembly operably coupled to the pin for moving the pin along the rotation axis independently of the linear movement of the upper shoulder by the upper forge assembly; and
a controller in communication with the upper and lower forge assemblies, said controller having a conventional friction stir welding mode and a self-reacting friction stir welding mode;
wherein when in said conventional friction stir welding mode, said lower forge assembly controls one of a discrete position of the pin and a force of the pin along the rotation axis, and when in said self-reacting friction stir welding mode, said lower forge assembly controls one of a lower forging force applied through the pin to a lower surface of a workpiece and a discrete position of the lower shoulder.

16. The friction stir welding tool of claim 15 further comprising a lower shoulder member, and wherein the pin further comprises a connector intermediate the upper shoulder member and the distal end of the pin; said connector cooperating with the lower shoulder member in a connected configuration to secure the lower shoulder member to the pin, and said controller placed in the self-reacting friction stir welding mode.

17. The friction stir welding tool of claim 16 wherein the lower shoulder member is not attached to the pin in a disconnected configuration, and said controller placed in the conventional friction stir welding mode.

18. The friction stir welding tool of claim 15 further comprising a switch changing the controller from the conventional to the self-reacting friction stir welding mode.

19. The friction stir welding tool of claim 15 wherein the pin is initially provided with a lower shoulder.

* * * * *